June 23, 1970 R. G. CUMMISFORD 3,516,882
METHOD FOR MANUFACTURE OF GYPSUM WALLBOARD
Filed Jan. 24, 1966

Robert G. Cummisford
INVENTOR.

BY
ATTORNEY

United States Patent Office 3,516,882
Patented June 23, 1970

3,516,882
METHOD FOR MANUFACTURE OF GYPSUM WALLBOARD
Robert G. Cummisford, Crystal Lake, Ill., assignor to The Celotex Corporation, Tampa, Fla., a corporation of Delaware
Filed Jan. 24, 1966, Ser. No. 522,630
Int. Cl. B32b *13/00, 31/00*
U.S. Cl. 156—39
6 Claims

ABSTRACT OF THE DISCLOSURE

A gypsum board is made without starch in the core by the application of dry starch at the interface between the gypsum slurry and the cover sheets. The starch may be applied to the slurry-contacting surface of each sheet or as a layer on the upper face of the slurry and on the slurry-contacting face of the lower cover sheet.

---

Figure 1:
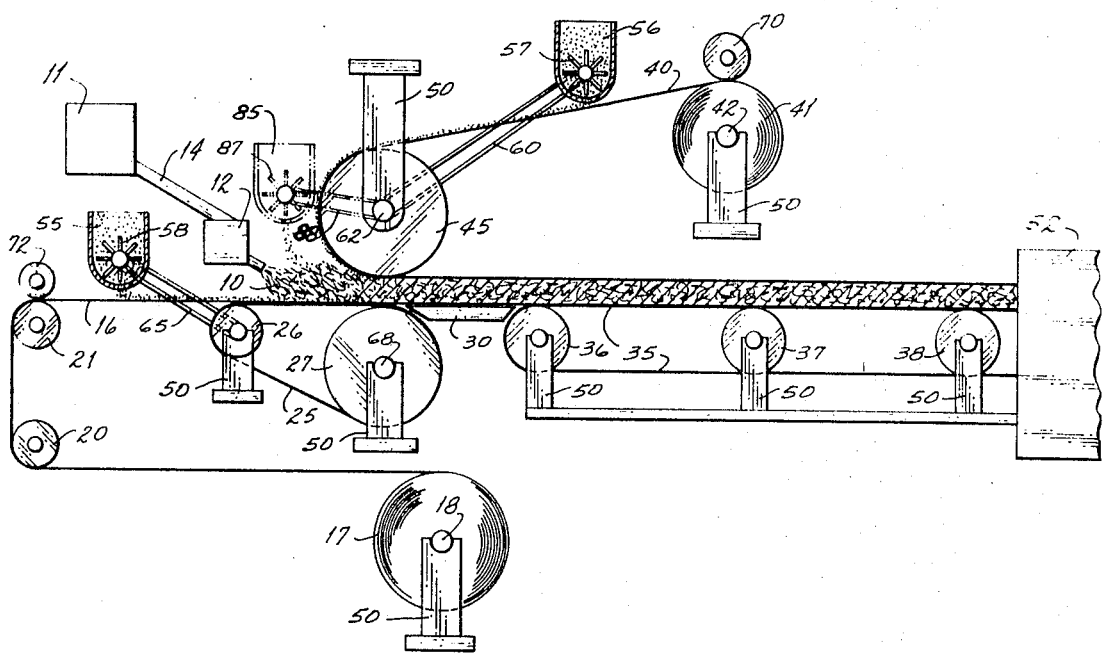

This invention pertains to the manufacture of gypsum wallboard, and more particularly to an apparatus and method of manufacturing gypsum wallboard in which paper cover sheets are secured to a dried gypsum core.

In the manufacture of gypsum wallboard it is conventional to deposit an aqueous slurry of gypsum between a pair of spaced paper cover sheets. It is believed that the paper cover sheets are secured to the surfaces of the enclosed gypsum slurry by means of gypsum crystals which are formed in the core, and particularly at the interfaces of cover sheets and the slurry core during the drying of the board in conventional ovens or kilns. During the drying phase, it is believed that elongated needle-like crystals of gypsum di-hydrate are formed and penetrate into the interstices of the paper fibers which form the cover sheets.

One of the difficulties encountered in the production of such gypsum wallboard is the failure of such needle-like crystals to be formed properly. If these crystals are not formed properly, the paper sheets will be easily separated from the gypsum core and form commercially unacceptable wallboard. These wallboards are generally referred to as "Peelers." In fact, unless the proper bond between the paper core sheets and the core is established, the cover sheets can well be separated from the core in the dryer. At other times, the improper bond may not become apparent until the gypsum boards are unwrapped on the jobsite.

It is conventional practice to incorporate starch or flour into the aqueous gypsum slurry on the theory that during the drying phase the starch or flour migrates to the interfaces between the paper cover sheets and the gypsum slurry to form a protective medium for the proper formation of the gypsum crystals. It has been found that in the absence of starch, the drying process calcines the gypsum crystals to calcium sulfate hemi-hydrate, thus destroying the desired bond.

In order to reduce the weight of the gypsum board, an aerated foam may be incorporated into the gypsum slurry. The foam may be introduced and stabilized in a number of conventional ways. Since the inclusion of foam is usual practice, details of its manufacture and introduction into the slurry are believed to be well known to those skilled in the art.

If desired, other ingredients, such as wax, glass fibers, inorganic minerals, or vegetable fibers may be added to the slurry for waterproofing, fireproofing or reinforcing the gypsum board. The methods of incorporating and the amounts of these ingredients for the purposes set forth are known and form no part of the specific invention.

It should be realized that the market for the sale of gypsum wallboard is exceptionally competitive and that any appreciable reduction in the cost of manufacturing such wallboard can represent a much improved market position. The conventional practice of making gypsum wallboard includes the incorporation of the starch in the gypsum slurry. Usually about 16 pounds of starch are incorporated per 1,000 square feet of 5/8 inch thick gypsum wallboard. With this invention, only about 3 pounds of starch are used for the same amount of wallboard. Thus, for 5/8 inch thick wallboard only about one fifth as much starch can be used.

It is an object of the present invention to provide an improved process for the manufacture of gypsum wallboard in a more economical manner.

It is a further object of the present invention to provide a method of making a gypsum wallboard which is not only more economical but which requires a minimum of additional mechanical equipment for its execution.

It is yet another object of the present invention to provide an apparatus by which the method may be carried out efficiently and economically.

The present invention is an improvement over the conventional gypsum wallboard process in that it eliminates the incorporation of starch in the aqueous gypsum slurry and provides a thin layer of dry, pre-gelatinized adhesive at the interface between the paper cover sheets and the aqueous gypsum slurry. As an additional feature, it has been found to be advantageous to roughen or abrade the surfaces of the facing sheets so that the dry particles of pre-gelatinized adhesive will remain adhered to these surfaces until contacted by the wet gypsum slurry.

Figure 2:
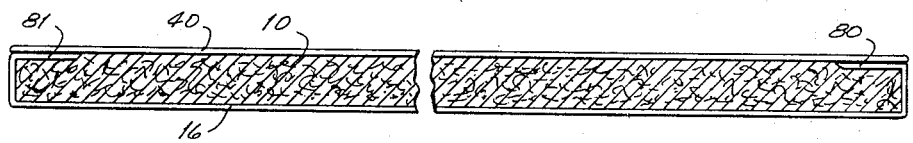

Other objects and advantages of the present invention will become apparent to those skilled in the art when the present invention is considered in the light of the accompanying specification and drawing in which:

FIG. 1 is a generally schematic elevational view of one embodiment of this invention, and FIG. 2 is a cross-sectional view of the gypsum wallboard made in accordance with the invention.

Referring now to the embodiment of the invention shown in FIG. 1, there is therein shown an apparatus for carrying out the process of the present invention. The apparatus itself is generally conventional with, however, the addition of means for abrading or roughening the surfaces of the paper cover sheets and distributor means for depositing dry, granulated pre-gelatinized particulate adhesive on the roughened surfaces.

The gypsum slurry 10 is composed of a mixture of calcined gypsum hemi-hydrate and water. The consistency of this slurry is conventional, as is the apparatus 11 for mixing the slurry. As previously discussed, such other ingredients as aerated foam, wax, glass or vegetable fibers or inorganic mineral additives may be incorporated in the slurry. However, for purposes of this invention, no starch is incorporated in the gypsum slurry. The mixed slurry 10 is transferred from the mixing apparatus 11 to a distribution means 12 over a chute 14. Distribution means 12 is conventional and may include a series of spaced pipes or tubes for uniform deposition of the gypsum slurry across the width of the machine.

The slurry 10 is deposited from the distribution means 12 across the width of paper cover sheet 16 which is unwound from a reel 17 supported on a journal axle 18. Idling rolls 20 and 21 are mounted and arranged to guide the paper sheet 16 from reel 17 to a conveyor belt 25 which is stretched between a roll 26 and a lower master roll 27. Paper sheet 16 is further carried across a support table 30 and a conveyor belt 35. Conveyor belt 35 is carried by spaced conveyor rolls 36, 37 and 38. The upper paper sheet 40 is unwound from a reel 41 mounted on a journal 42 and is carried around an upper master roll 45. Suitable supporting members 50 are provided for mounting the various journals and rolls. The mounting structures and the drive mechanisms for rotation for the various rolls and journals do not form a part of the invention per se and therefore are not shown in the interests of simplicity and clarity. Suitable paper folding devices, whereby the edges of lower paper sheet 16 are folded inwardly to form a closed casing with the upper sheet 40 are not shown.

As may be seen, the paper enclosed wet slurry is conveyed into a dryer 52 wherein the core is dried and set.

In order to properly contrast the invention from conventional gypsum board manufacture, the conventional method of making gypsum will first be described and then the inventive improvement will follow.

Referring to the apparatus of FIG. 1, the lower paper sheet 16 is unwound from reel 17 and conveyed by means of conveyor belts 25 and 35 past the nip of upper and lower master rolls 27 and 45 respectively toward the dryer 52. The aqueous slurry, which is a mixture of water and gypsum hemi-hydrate with starch, is deposited as a uniform stream across the width of the lower cover sheet 16. Just prior to the entry of the slurry and lower cover sheet 16 into the nip of master rolls 27 and 45, the outer edges of the lower cover sheet 16 are folded upwardly and inwardly to properly enclose the wet slurry 10. The upper cover sheet 40 is applied to the upper surface of the slurry 10 and to the upper surface of the inward folds of the lower cover sheet 16.

As in the conventional practice, a thin layer of bone glue or other suitable adhesive may be used to secure the upper and lower cover sheets together.

As the board proceeds through the dryer 52, the water of the aqueous slurry is driven off in the form of steam. As the steam moves from the center of the core toward the paper it carries with it some of the starch to the interface between the gypsum slurry and the paper cover sheets. It is believed that this migrated starch at the interface, forms a protective coating around the formed gypsum crystals so that they can penetrate into the fibers of the cover sheets and form a strong bond between the core and the sheets. Since not all of the starch migrates to the surface, an excess of the starch must be added to the slurry in order to provide proper bond.

The present invention is based upon an improvement of the conventional manufacture of wallboard in that the starch usually incorporated in the slurry is eliminated and a layer of dry, granulated, pre-gelatinized adhesive is applied to the surfaces of the cover sheets which are adjacent to the wet slurry, by applicating means 55 and 56. The applicating means 55 and 56 are bins or hoppers having a sieve-like or mesh bottoms with rotatable paddles 57 and 58 to sprinkle the pre-gelatinized adhesive on the slurry-facing surfaces of sheets 16 and 40.

Paddle 57 is connected to a drive mechanism 60 which in turn is connected to the driven axle 62 of upper master roll 45. Axle 62 is driven by a power source (not shown) at a constant rotational speed determined by the desired linear speed of the machine so that the speed of rotation of paddle 57 is a direct function of the speed of manufacture of the gypsum wallboard. Thus, the amount of dry adhesive deposited on the surface of the paper sheet 40 can be carefully controlled to an amount of about 1½ pounds per 1,000 square feet of sheet 40.

In a similar manner and for the same purpose, paddle 58 is connected over a drive mechanism 65 to the axle 68 of lower master roll 27.

The details of the drive mechanism have not been shown since they may consist of known drive wheels, cams, gears or other mechanisms generally known in the art. Also since the machine speed can vary within wide limits, the specific gear ratios and speeds of the various drive mechanisms can also vary.

The sizes of the screen mesh and the speed rotation, of the paddle mechanisms can be adjusted so as to provide a deposit of about 3 pounds of starch per 1,000 square feet of wallboard at a conventional machine speed. This amount of starch per 1,000 square feet is the same regardless of the thickness of the gypsum wallboard since all of the starch is used most efficiently.

It has also been found advantageous to roughen or abrade the faces of the cover sheets to which the pre-gelatinized adhesive is applied by means of abrading wheels 70 and 72. The purpose of the roughening of the surface of the sheet is to overcome any slickness caused by the sizing and calendaring of the sheets as they are manufactured. If special uncalendered and unsized paper is purchased, the necessity for such abrading action is reduced.

The adhesive used in this invention must be a dried, granulated or powdered, pre-gelatinized adhesive. Pre-gelatinized starches or cold water soluble starches are often commercially referred to as cold water paste starch, starch flour, etc. The starch may be secured in its non-gelatinized state and gelatinized by the conventional heating in water to a temperature of about 60–80° C. Alternatively, the starch may be gelatinized by acid or enzyme treatments so that it is rapidly soluble in cold water to an extent of more than 35%. It should be understood that the pre-gelatinized starch is added in dry, particulate form made by a quick drying process. Suitable pre-gelatinized starches or flours are those having the following description:

Viscosity 10 sec. to 80.0 sec. (tested at 40° C. Ostwals-Fenske #200 standard viscosimeter using 1.30 g. starch material in 50 ml. 1 N KOH), and cold water solubles from 25 to 80%.

Reference may now be had to FIG. 2 for an understanding of the final product of the invention. Lower cover sheet 16 is folded upwardly and then inwardly so its edges 80 and 81 overlie the edge portion of set gypsum core 10. The top cover sheet 40 is glued to the upper surface of the edges 80 and 81 of lower cover sheet 16 while the gypsum crystals at the interface of the core and the innersides of sheets 16 and 40 penetrate into these sheets to form a strong gypsum core to paper bond.

In accordance with the invention, it is believed that the depositing of a thin layer of pre-gelatinized adhesive at the interfaces of the paper cover sheets and the wet slurry forms a colloidal protective covering so that the gypsum crystals may form properly without being calcined.

A fully equivalent method of performing the present invention is to deposit the dry pre-gelatinized adhesive directly on the upper surface of the slurry just prior to its entry below the top master roll instead of depositing the adhesive on the surface of the upper paper cover sheet. For this purpose, adhesive applicating means 85 is provided. Means 85 may be a hopper with a seive-like bottom and a paddle means 87 driven by an operating means 88 connected to the journal axle 62 of master roll 45. In this alternative variation the dried, particulate, pre-gelatinized adhesive is directly deposited on the upper surface of slurry 10 just prior to its entry under the top master roll 45. The depositing of the dried, particulate pre-gelatinized adhesive to the slurry-facing surface of the lower paper sheet 16 continues as before.

It is thus seen that the present invention represents a simplified method of making gypsum wallboard at a reduced cost compared to the conventional method of making such wallboard. In addition, the apparatus is only slightly modified, in order to achieve the unusual advantages of the present invention.

While a specific embodiment of the present invention has been herein set forth and described, various changes and modifications will occur to those skilled in the art, and it is intended that the accompanying claims include such changes and modifications.

I claim:
1. In the process for making a gypsum board which comprises the steps of mixing an aqueous slurry of gypsum, enclosing said aqueous slurry of gypsum between two spaced sheets of paper, and drying said paper sheet enclosed aqueous slurry to form a gypsum board, the improvement which comprises the step of depositing a layer of dry, granulated, pre-gelatinized adhesive at each interface between said aqueous slurry and said spaced sheets of paper prior to the enclosure of said aqueous slurry.

2. The process for making a gypsum board in accordance with the step of claim 1 in which said step of depositing said layer of dry, granulated, pre-gelatinized adhesive at each interface is done by depositing a first layer of dry, granulated, pre-gelatinized adhesive on the outer surface of the aqueous slurry of gypsum and a second such layer on the slurry-facing surface of one of said sheets of paper.

3. The process for making a gypsum board in accordance with the step of claim 1 in which said step of depositing said layer of dry, granulated, pre-gelatinized adhesive at each interface is done by depositing a first layer of dry, granulated, pre-gelatinized adhesive on the top of the aqueous slurry of gypsum at one of said interfaces and a second such layer on the slurry-facing surface of one of said sheets of paper at the other of said interfaces.

4. The process for making a gypsum board in accordance with the step of claim 1 in which said step of depositing said layer of dry, granulated, pre-gelatinized adhesive at each interface is done by depositing a layer of dry, granulated, pre-gelatinized adhesive on the slurry-facing surface of each of said paper sheets prior to the enclosure of said aqueous slurry.

5. The process for making a gypsum board in accordance with the step of claim 1 in which said dry, granulated, pre-gelatinized adhesive is an adhesive selected from the group consisting of flour or starch.

6. In the process for making a gypsum board in accordance with the step of claim 1 in which said slurry-facing surface of each of said paper sheets is roughened prior to the said depositing of said layer of dry, pre-gelatinized adhesive.

References Cited

UNITED STATES PATENTS

| | | | |
|---|---|---|---|
| Re. 17,048 | 7/1928 | Tupper | 156—153 |
| 1,870,439 | 8/1932 | Birdsey | 161—270 |
| 2,044,401 | 6/1936 | Roos | 161—270 |

MORRIS SUSSMAN, Primary Examiner

U.S. Cl. X.R.

156—153, 283, 336; 161—270